United States Patent
Miyazawa

(10) Patent No.: US 10,162,987 B2
(45) Date of Patent: Dec. 25, 2018

(54) CARD READER

(71) Applicant: NIDEC SANKYO CORPORATION, Suwa-gun, Nagano (JP)

(72) Inventor: Shinya Miyazawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 15/513,819

(22) PCT Filed: Aug. 21, 2015

(86) PCT No.: PCT/JP2015/073514
§ 371 (c)(1),
(2) Date: Mar. 23, 2017

(87) PCT Pub. No.: WO2016/047327
PCT Pub. Date: Mar. 31, 2016

(65) Prior Publication Data
US 2017/0293778 A1    Oct. 12, 2017

(30) Foreign Application Priority Data
Sep. 26, 2014  (JP) .................................. 2014-196422

(51) Int. Cl.
*G06K 7/10*  (2006.01)
*G06K 13/00*  (2006.01)
(Continued)

(52) U.S. Cl.
CPC .............. *G06K 7/087* (2013.01); *G06K 7/01* (2013.01); *G06K 13/06* (2013.01);
(Continued)

(58) Field of Classification Search
CPC .......... G06K 7/087; G06K 7/01; G06K 13/06; G06K 13/0862; G07F 7/0873;
(Continued)

(56) References Cited

FOREIGN PATENT DOCUMENTS

| JP | 2001222686 A | 8/2001 |
|---|---|---|
| JP | 2005056376 A | 3/2005 |

OTHER PUBLICATIONS

Machine English-language translation of JP2001222686. JP2001222686 is dated Aug. 17, 2001.*

(Continued)

*Primary Examiner* — Daniel Hess
(74) *Attorney, Agent, or Firm* — Cantor Colburn LLP

(57) ABSTRACT

A card reader may include card insertion port; a plurality of types of pulling-out detection mechanisms; and a pulling-out prevention mechanism. The pulling-out prevention mechanism may include a lock member having a prevention part configured to contact with the card and prevent pulling-out of the card; and a moving mechanism structured to move the lock member between a contact position and a retreated position. The plurality of types of the pulling-out detection mechanisms may the abnormal pulling-out of the card by methods different from each other. The lock member is moved to the contact position from the retreated position to prevent pulling-out of the card when the abnormal pulling-out of the card from the card insertion port is detected by the plurality of types of the pulling-out detection mechanisms.

11 Claims, 4 Drawing Sheets

(51) Int. Cl.
*G06K 7/08* (2006.01)
*G06K 13/06* (2006.01)
*G06K 7/01* (2006.01)
*G06K 13/08* (2006.01)
*G07F 7/08* (2006.01)
*H04L 29/06* (2006.01)

(52) U.S. Cl.
CPC ....... *G06K 13/0862* (2013.01); *G07F 7/0873* (2013.01); *H04L 63/1483* (2013.01); *B65H 2404/725* (2013.01); *B65H 2407/11* (2013.01); *B65H 2701/1914* (2013.01)

(58) Field of Classification Search
CPC .......... H04L 63/1483; B65H 2404/725; B65H 2407/11; B65H 2701/1914
USPC ................................................ 235/449, 380
See application file for complete search history.

(56) References Cited

OTHER PUBLICATIONS

International Search Report corresponding to Application No. PCT/JP2015/073514; dated Sep. 15, 2015, with English translation.

\* cited by examiner

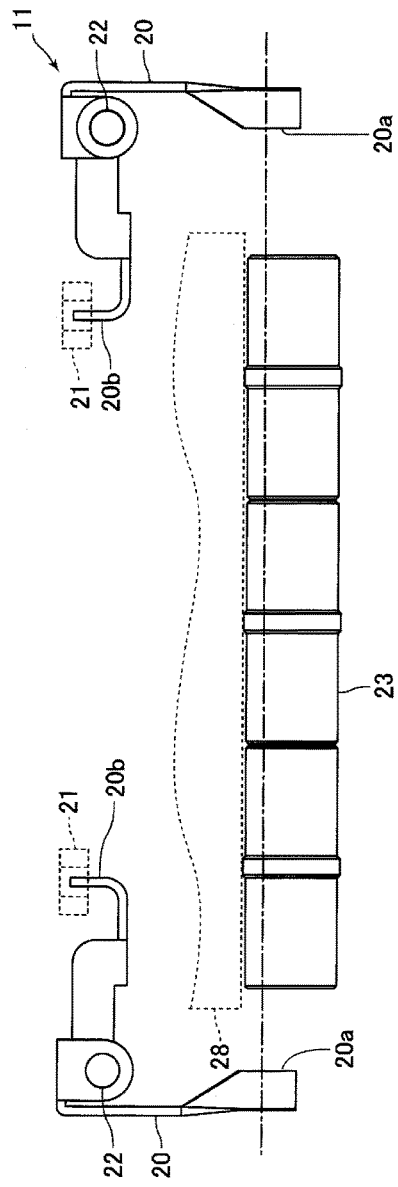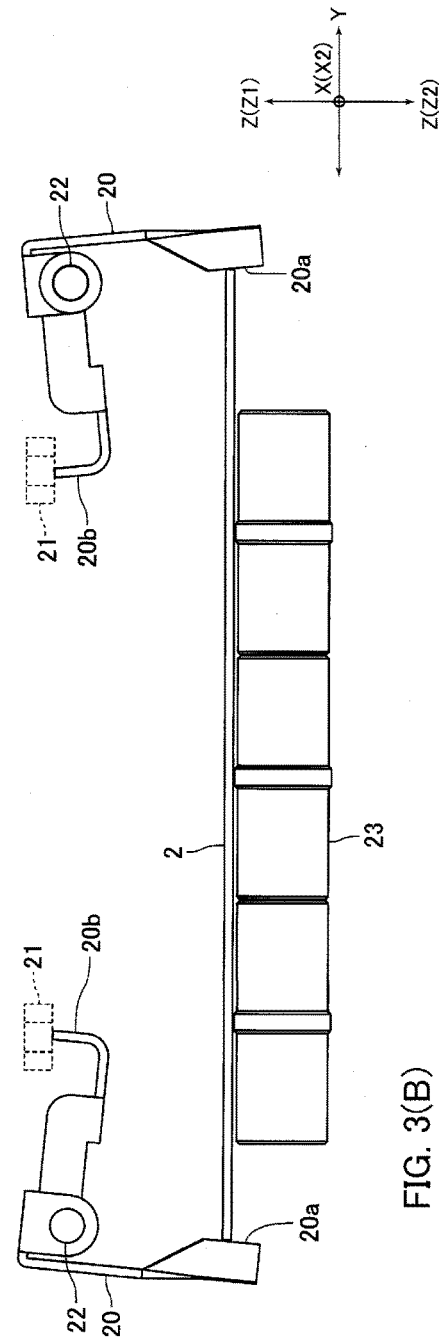
FIG. 3(A)
FIG. 3(B)

CARD READER

CROSS REFERENCE TO RELATED APPLICATIONS

This is the U.S. national stage of application No. PCT/JP2015/073514, filed on Aug. 21, 2015. Priority under 35 U.S.C. § 119(a) and 35 U.S.C. § 365(b) is claimed from Japanese Application No. 2014-196422, filed Sep. 26, 2014, the disclosures of which are incorporated herein by reference.

FIELD OF THE INVENTION

At least an embodiment of the present invention relates to a card reader structured to perform reading of data recorded on a card and/or recording of data to a card.

BACKGROUND

Conventionally, a card reader has been widely utilized which is structured to perform reading of data recorded on a card and/or recording of data to a card. In an industry such as a financial institution where a card reader is utilized, illegal acquisition of a card by a criminal who intentionally clogs the card inside the card reader and then pulls out the card from a card insertion port, i.e., so-called phishing has been a large issue. Therefore, conventionally, a card reader having a prevention mechanism for preventing phishing has been proposed (see, for example, Patent Literature 1).

The card reader described in Patent Literature 1 includes a shutter which is movable between a position where a card conveying passage is closed and a position where the card conveying passage is opened, a shutter detection mechanism which detects an open position of the shutter, and an abnormal stop detection mechanism structured to detect an abnormal stop of the card. The abnormal stop detection mechanism is a plurality of card detection mechanisms structured to detect existence/absence of a card in a card conveying passage. Further, in the card reader, the prevention mechanism includes a needle, which is contacted with a surface of a card with a predetermined pressure or is stuck into the card, and a solenoid for operating the needle.

In the card reader described in Patent Literature 1, when an abnormal stop of a card is detected by the abnormal stop detection mechanism, if it is detected by the shutter detection mechanism that the shutter opens the card conveying passage, the solenoid is activated and the needle is contacted with a predetermined pressure with the surface of the card or is stuck into the card. Therefore, in the card reader, pulling-out of the card from a card insertion port by a criminal can be prevented and, as a result, illegal acquisition of the card by the criminal can be prevented.

CITATION LIST

[PTL 1] Japanese Patent Laid-Open No. 2001-222686

As described above, in the card reader described in Patent Literature 1, when an abnormal stop of a card is detected by the abnormal stop detection mechanism, if it is detected by the shutter detection mechanism that the shutter opens the card conveying passage, the solenoid of the prevention mechanism is activated and thus the needle is contacted with a predetermined pressure with the surface of the card or is stuck into the card. When the needle is contacted with a predetermined pressure with the surface of the card or is stuck into the card, the card cannot be pulled out from a card insertion port. Therefore, if once the solenoid of the prevention mechanism is activated and the needle is contacted with a predetermined pressure with the surface of the card or is stuck into the card, it takes a long time for a following recovery work of the card reader. Further, if once the solenoid of the prevention mechanism is activated and the needle is contacted with a predetermined pressure with the surface of the card or is stuck into the card, the card may be damaged or a hole is opened and thus the card may be unusable.

Therefore, like the card reader described in Patent Literature 1, in the card reader including a mechanism structured to prevent pulling-out of a card from a card insertion port in order to prevent phishing, it is preferable that it is detected whether phishing is going to be performed or not with a high degree of accuracy and an erroneous operation of the mechanism structured to prevent pulling-out of a card is restrained.

SUMMARY

In view of the problem described above, at least an embodiment of the present invention provides a card reader including a pulling-out prevention mechanism structured to prevent pulling-out of a card from a card insertion port in order to prevent phishing, the card reader being capable of detecting whether phishing is going to be performed or not with a high degree of accuracy and thereby an erroneous operation of the pulling-out prevention mechanism is restrained.

To solve the above-mentioned problem, at least an embodiment of the present invention provides a card reader including a card insertion port into which a card is inserted and from which the card is ejected, a plurality of types of pulling-out detection mechanisms structured to detect abnormal pulling-out of the card from the card insertion port, and a pulling-out prevention mechanism structured to prevent the abnormal pulling-out of the card from the card insertion port. The pulling-out prevention mechanism includes a lock member which is formed with a prevention part configured to contact with the card and prevent pulling-out of the card, and a moving mechanism structured to move the lock member between a contact position where the prevention part is contacted with the card and a retreated position where the prevention part is retreated so as to be separated from the card. The plurality of types of the pulling-out detection mechanisms detects the abnormal pulling-out of the card by respective methods different from each other, and the lock member is moved to the contact position from the retreated position to prevent pulling-out of the card when the abnormal pulling-out of the card from the card insertion port is detected by the plurality of types of the pulling-out detection mechanisms.

The card reader in accordance with at least an embodiment of the present invention includes a plurality of types of pulling-out detection mechanisms structured to detect abnormal pulling-out of a card from a card insertion port, which is an actual phishing act. The plurality of types of the pulling-out detection mechanisms detects abnormal pulling-out of a card by respective methods different from each other. Therefore, according to at least an embodiment of the present invention, it is capable of detecting whether phishing is going to be performed or not with a high degree of accuracy. Further, in at least an embodiment of the present invention, when abnormal pulling-out of a card from a card insertion port is detected by the plurality of types of the pulling-out detection mechanisms, the prevention part is contacted with the card and the pulling-out of the card is prevented. Therefore, an erroneous operation of the pulling-out prevention mechanism can be restrained.

In at least an embodiment of the present invention, the card reader includes, for example, a card conveying passage where the card inserted into the card insertion port is conveyed, and a shutter member which is movable between a closing position where the card conveying passage is closed so that the card is not taken into the card reader and an open position where the card conveying passage is opened so that the card is capable of being taken into the card reader. The plurality of types of the pulling-out detection mechanisms and the prevention part are disposed on a front side with respect to the shutter member in a conveying direction of the card. In this case, even when a card is conveyed to a front side with respect to the shutter member (in other words, to a position nearer to the card insertion port than the shutter member), abnormal pulling-out of the card can be prevented.

In at least an embodiment of the present invention, the card reader includes, as the plurality of types of the pulling-out detection mechanisms, a thickness detection mechanism structured to detect a thickness of the card, a width detection mechanism structured to detect an end part in a width direction of the card which is perpendicular to a thickness direction of the card and a conveying direction of the card, and a card existence/absence detection mechanism structured to detect existence/absence of the card. When the abnormal pulling-out of the card from the card insertion port is detected by all of the thickness detection mechanism, the width detection mechanism and the card existence/absence detection mechanism, the lock member is moved to the contact position from the retreated position to prevent the pulling-out of the card. In this case, it is capable of detecting whether phishing is going to be performed or not with a high degree of accuracy by using the thickness detection mechanism, the width detection mechanism and the card existence/absence detection mechanism.

In at least an embodiment of the present invention, the card reader includes, for example, a conveying roller structured to convey the card inserted into the card insertion port, and a motor which is a drive source structured to drive the conveying roller. In addition, the card reader includes, as the plurality of types of the pulling-out detection mechanisms, a thickness detection mechanism structured to detect a thickness of the card, a width detection mechanism structured to detect an end part in a width direction of the card which is perpendicular to a thickness direction of the card and a conveying direction of the card, a card existence/absence detection mechanism structured to detect existence/absence of the card, and a rotation detection mechanism structured to detect a rotating state of the motor, and it may be structured that, when the abnormal pulling-out of the card from the card insertion port is detected by all of the thickness detection mechanism, the width detection mechanism, the card existence/absence detection mechanism and the rotation detection mechanism, the lock member is moved to the contact position from the retreated position to prevent the pulling-out of the card. In this case, it is capable of detecting whether phishing is going to be performed or not with a high degree of accuracy by using the thickness detection mechanism, the width detection mechanism, the card existence/absence detection mechanism and the rotation detection mechanism.

In at least an embodiment of the present invention, it is preferable that the prevention part is pointed so as to be capable of sticking into a card. According to this structure, pulling-out of a card by a criminal is capable of being prevented effectively.

As described above, in at least an embodiment of the present invention, in a card reader including a pulling-out prevention mechanism structured to prevent pulling-out of a card from a card insertion port in order to prevent phishing, the card reader is capable of detecting whether phishing is going to be performed or not with a high degree of accuracy and an erroneous operation of the pulling-out prevention mechanism is restrained.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIGS. 3(A) and 3(B) are front views for explaining a structure on a front end side of a card insertion part shown in FIG. 2.

DETAILED DESCRIPTION

An embodiment of the present invention will be described below with reference to the accompanying drawings.
(Schematic Structure of Card Reader)

Figure 1:
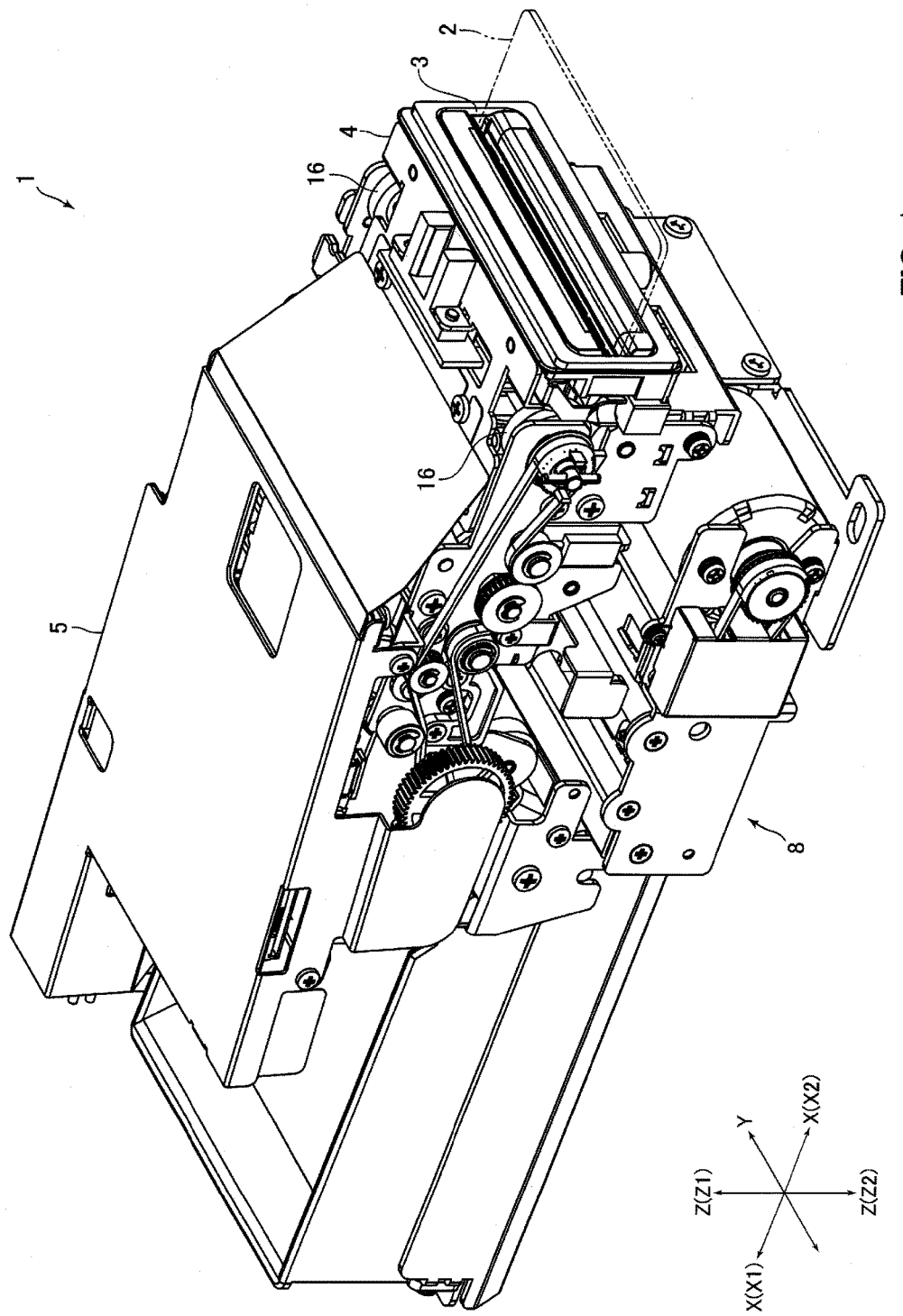
FIG. 1 is a perspective view showing a card reader in accordance with an embodiment of the present invention.

FIG. 1 is a perspective view showing a card reader 1 in accordance with an embodiment of the present invention.

A card reader 1 in this embodiment is a device which is structured to perform reading of data recorded on a card 2 and/or recording of data to a card 2, and is, for example, mounted and used in a predetermined host apparatus such as an ATM (Automated Teller Machine). The card reader 1 includes a card insertion part 4 formed with an insertion port 3 into which a card 2 is inserted and from which the card is ejected, and a main body part 5. A card conveying passage 6 (see FIG. 2) where a card 2 inserted from the card insertion port 3 is conveyed is formed inside the card reader 1. The card reader 1 includes a card conveying mechanism structured to convey a card 2.

A card 2 is a rectangular card made of vinyl chloride whose thickness is about 0.7-0.8 mm. The card 2 in this embodiment is a card formed with a magnetic stripe in conformity with the international standard (for example, ISO/IEC7811) or JIS standard (for example, JISX6302) and is formed in a substantially rectangular shape whose four corners are rounded. A rear face of the card 2 is formed with a magnetic stripe where magnetic data are recorded. Further, an IC chip is incorporated into the card 2.

In this embodiment, the card 2 is conveyed in the "X" direction shown in FIG. 1 and the like. In other words, the "X" direction is a conveying direction of the card 2. Further, in this embodiment, the card 2 is inserted and taken in the "X1" direction and the card 2 is ejected in the "X2" direction. Further, in this embodiment, a card 2 is taken into the card reader 1 so that a short-side direction of the card 2 and the "X" direction are coincided with each other and is conveyed inside the card reader 1. In other words, the card reader 1 conveys the card 2 in a short-side direction of the card 2 and a predetermined processing is performed.

The "Y" direction which is perpendicular to the "X" direction is a longitudinal direction of a card 2 taken into the card reader 1 in a correct posture and is a width direction of the card 2. Further, the "Z" direction in FIG. 1 and the like perpendicular to the "X" direction and the "Y" direction is a thickness direction of the card 2 taken into an inside of the card reader 1. In this embodiment, the card reader 1 is disposed so that the "Z" direction and a vertical direction are coincides with each other. In the following descriptions, the "X" direction is referred to as a "front and rear direction", the "Y" direction is referred to as a "right and left direction", and the "Z" direction is referred to as an "upper and lower direction". Further, the "X1" direction side is referred to as a "back (rear)" side, the "X2" direction side is referred to as a "front" side, the "Z1" direction side as an "upper" side, and the "Z2" direction side as a "lower" side.

The card insertion part 4 is attached to a front face side of the main body part 5 and structures a front face side portion of the card reader 1. A specific structure of the card insertion part 4 will be described below.

The main body part 5 includes a magnetic head (not shown) structured to read magnetic data recorded on a card 2 and/or record magnetic data to a card 2. The magnetic head is disposed so as to face the card conveying passage 6 from a lower side of the card conveying passage 6. Further, the magnetic head is mounted on a carriage which is movable in the right and left direction. The carriage is connected with a carriage drive mechanism 8 and the magnetic head is moved in the right and left direction together with the carriage. Further, the magnetic head is capable of being moved up and down between a position where the magnetic head is capable of contacting with a card 2 and a position where the magnetic head is retreated from the card conveying passage 6.

The main body part 5 includes IC contact point springs (not shown) structured to perform data communication with an IC chip incorporated into a card 2. The IC contact point springs are disposed so as to face the card conveying passage 6 from an upper side of the card conveying passage 6. Further, the IC contact point springs are fixed to an IC contact block (not shown). The IC contact block is connected with an IC contact block drive mechanism and the IC contact point springs are capable of being moved up and down between a position where the IC contact point springs are capable of contacting with a card 2 and a position where the IC contact point springs are retreated from the card conveying passage 6.

In addition, the main body part 5 includes a positioning mechanism (not shown) structured to position a card 2 which has been taken into the card reader 1. The main body part 5 is disposed with conveying rollers and pad rollers (not shown) which structure the card conveying mechanism. The conveying rollers are disposed so as to face the card conveying passage 6 from an upper side. The pad rollers are oppositely disposed to the conveying rollers so as to face the card conveying passage 6 from a lower side.

(Structure of Card Insertion Part)

Figure 2:
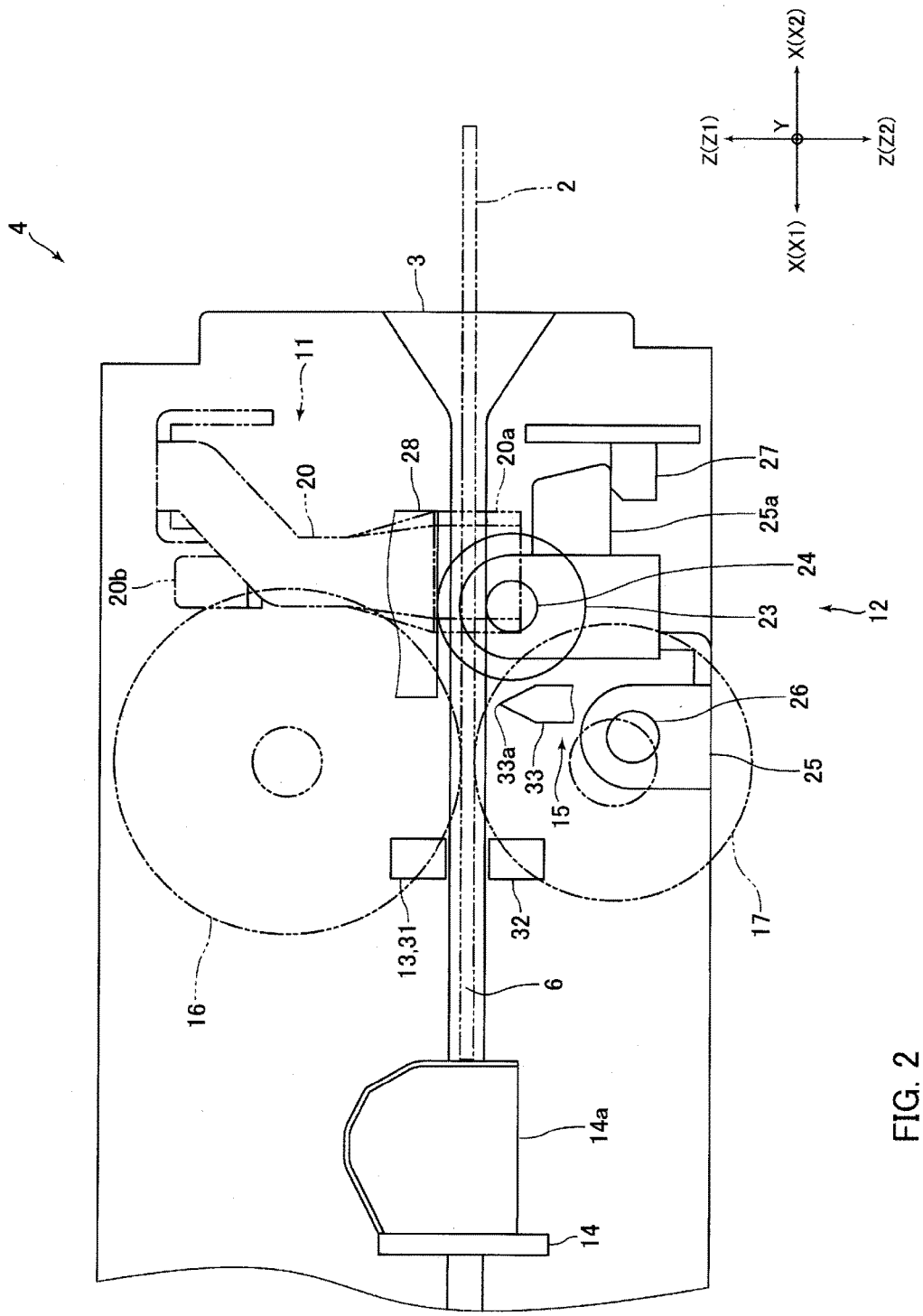
FIG. 2 is a side view for explaining a structure of a card insertion part shown in FIG. 1.
Figure 4:
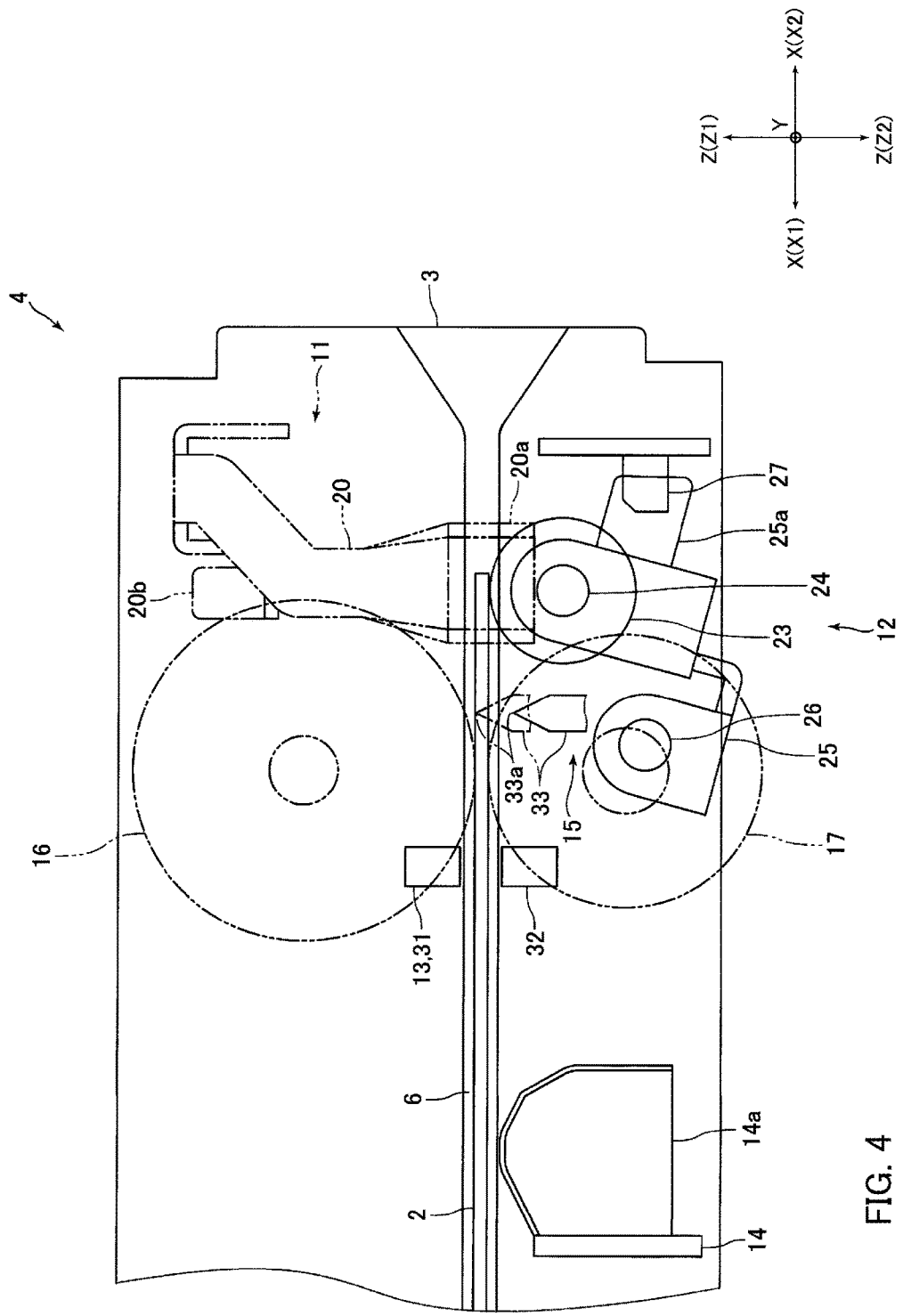
FIG. 4 is a side view for explaining a state just before a lock member starts operation in a card insertion part shown in FIG. 2.

FIG. 2 is a side view for explaining a structure of the card insertion part 4 shown in FIG. 1. FIGS. 3(A) and 3(B) are front views for explaining a structure on a front end side of the card insertion part 4 shown in FIG. 2. FIG. 4 is a side view for explaining a state just before a lock member 33 starts operation in the card insertion part 4 shown in FIG. 2.

The card insertion part 4 includes a width detection mechanism 11 structured to detect end parts in the right and left direction of a card 2, a thickness detection mechanism 12 structured to detect a thickness of the card 2, a card existence/absence detection mechanism 13 structured to detect existence/absence of the card 2, a shutter member 14 disposed in a rear side portion of the card insertion part 4, and a pulling-out prevention mechanism 15 structured to prevent abnormal pulling-out of the card 2 from the card insertion port 3. Further, the card insertion part 4 is disposed with a conveying roller 16 and a pad roller 17 which structure the card conveying mechanism.

The width detection mechanism 11 is disposed on a front end side of the card insertion part 4. The width detection mechanism 11 includes two detection levers 20 which are disposed on both end sides in the right and left direction of the card insertion part 4 and are capable of protruding to and retreating from the card conveying passage 6, and two sensors 21 (see FIGS. 3(A) and 3(B)) configured to detect respective movements of the two detection levers 20 (in other words, configured to detect protruding-retreating states of the two detection levers 20 to and from the card conveying passage 6). The sensor 21 is a transmission type optical sensor which includes a light emitting element and a light receiving element configured to receive a light from the light emitting element.

The detection levers 20 are provided with card contact parts 20a, which are protruded to and retreated from the card conveying passage 6 on both right and left end sides of the card conveying passage 6 and are capable of contacting with respective both ends in the right and left direction of a card 2, and light intercepting parts 20b configured to intercept a light from the light emitting element to the light receiving element of the sensor 21. An upper side of the card contact part 20a is turnably held by a fixed shaft 22 (see FIGS. 3(A) and 3(B)) which is fixed to a frame of the card insertion part 4a with the front and rear direction as an axial direction. Further, the detection lever 20 is urged by an urging member such as a spring not shown so that the card contact part 20a is moved to an inner side in the right and left direction.

In a standby state before a card 2 is inserted into the card reader 1, the card contact part 20a is disposed inside the card conveying passage 6 by an urging force of the urging member. In this case, as shown in FIG. 3(A), the light intercepting part 20b intercepts a light from the light emitting element to the light receiving element of the sensor 21. In this state, when a card 2 is inserted into the card insertion port 3 so that the short-side direction of the card 2 is coincided with the front and rear direction, both right and left ends of the card 2 contact with two detection levers 20 respectively and the detection levers 20 are turned with the fixed shafts 22 as turning centers. When the detection levers 20 are turned, as shown in FIG. 3(B), the light intercepting parts 20b are separated from a position between the light emitting element and the light receiving element of the sensor 21. As a result, the light receiving elements receive lights from the light emitting elements in the two sensors 21 and thereby it is detected that the card 2 has been inserted into the card insertion port 3 so that the short-side direction of the card 2 is coincided with the front and rear direction.

The thickness detection mechanism 12 includes a roller 23 which is capable of rotating with the right and left direction as an axial direction of rotation, a shaft 24 which rotatably holds the roller 23, a shaft holding member 25 to which the shaft 24 is fixed, a fixed shaft 26 which turnably holds the shaft holding member 25, and a sensor 27 configured to detect movement of the roller 23. The sensor 27 is a transmission type optical sensor which includes a light emitting element and a light receiving element configured to receive a light from the light emitting element.

The roller 23 is disposed at substantially the same position as the card contact part 20a in the front and rear direction. The shaft 24 is disposed so that its axial direction and the right and left direction are coincided with each other and is fixed to an upper end side of the shaft holding member 25. The fixed shaft 26 is fixed to the frame of the card insertion part 4 with the right and left direction as its axial direction. The shaft holding member 25 is formed with a light intercepting part 25a configured to intercept a light from the light emitting element to the light receiving element of the sensor 27. The shaft holding member 25 is disposed to a lower side of the card conveying passage 6.

The roller 23 is turnable together with the shaft holding member 25 with the fixed shaft 26 as a center. Further, the roller 23 is movable between a position where a part on an upper end side of the roller 23 is disposed inside the card conveying passage 6 to be capable of contacting with a card 2 (position shown in FIGS. 2 and 3(A)) and a position where the roller 23 is retreated on a lower side of the card conveying passage 6 (position shown in FIGS. 4 and 3(B)). In other words, the roller 23 is capable of being protruded to and retreated from the card conveying passage 6. The shaft holding member 25 is urged by an urging member such as a spring not shown in a direction so that the roller 23 is moved upward. An abutting member 28 with which an upper end of the roller 23 is capable of being abutted is disposed to an upper side of the roller 23. The abutting member 28 is fixed to the frame of the card insertion part 4 and is disposed to an upper side of the card conveying passage 6.

In a standby state before a card 2 is inserted into the card reader 1, the roller 23 is urged toward an upper side by an urging force of the urging member which urges the shaft holding member 25, and a part on an upper end side of the roller 23 is disposed inside the card conveying passage 6. In this case, as shown in FIG. 2, the light intercepting part 25a is separated from a position between the light emitting element and the light receiving element of the sensor 27. In this state, when a card 2 inserted into the card insertion port 3 is contacted with the roller 23, the roller 23 is retreated to a lower side against the urging force of the urging member. When the roller 23 is retreated to a lower side, as shown in FIG. 4, the light intercepting part 25a intercepts a light between the light emitting element and the light receiving element of the sensor 27. Therefore, the light from the light emitting element to the light receiving element of the sensor 27 is intercepted by the light intercepting part 25a and thereby it is detected that the card 2 having a predetermined thickness has been inserted into the card insertion port 3. In this embodiment, the thickness detection mechanism 12 is also functioned as a shutter which closes the card conveying passage 6.

The card existence/absence detection mechanism 13 is a transmission type optical sensor which is structured of a light emitting part 31 having a light emitting element and a light receiving part 32 having a light receiving element configured to receive a light from the light emitting element of the light emitting part 31. The light emitting part 31 and the light receiving part 32 are disposed on a rear side with respect to the roller 23. Further, the light emitting part 31 and the light receiving part 32 are disposed so as to interpose the card conveying passage 6 therebetween in the upper and lower direction. Therefore, when no card 2 is existed in a portion of the card conveying passage 6 where the light emitting part 31 and the light receiving part 32 are disposed, the light receiving part 32 receives a light from the light emitting part 31 and, when a card 2 is existed in the portion of the card conveying passage 6 where the light emitting part 31 and the light receiving part 32 are disposed, the card 2 intercepts the light from the light emitting part 31 to the light receiving part 32. Accordingly, when a light from the light emitting part 31 to the light receiving part 32 is intercepted by a card 2, it is detected that the card 2 is existed in a portion of the card conveying passage 6 where the light emitting part 31 and the light receiving part 32 are disposed.

The shutter member 14 is movable between a closing position (position shown in FIG. 2) at which the card conveying passage 6 is closed so that a card 2 is not taken into an inside of the card reader 1 (specifically, inside the main body part 5) and an open position (position shown in FIG. 4) at which the card conveying passage 6 is opened so that a card 2 is capable of being taken into the inside of the card reader 1. The shutter member 14 is connected with a shutter drive mechanism (not shown) structured to move the shutter member 14 between the closing position and the open position. The shutter member 14 is formed with a protruded part 14a which protrudes to a front side. A front end face of the protruded part 14a is formed to be a card abutting face with which, for example, a rear end of a card 2 forcibly inserted into the card insertion port 3 at an unexpected speed is abutted when the shutter member 14 is located at the closing position.

The pulling-out prevention mechanism 15 is, for example, similarly structured to the prevention mechanism described in the above-mentioned Patent Literature 1, and includes a lock member 33 formed with a prevention part 33a configured to contact with a card 2 and prevent pulling-out of the card 2 and a moving mechanism (not shown) structured to move the lock member 33. The prevention part 33a is pointed so as to be capable of sticking into a card 2. The prevention part 33a is movable in the upper and lower direction. Further, the prevention part 33a is disposed between the card contact parts 20a and the roller 23 and the light emitting part 31 and the light receiving part 32 in the front and rear direction. The moving mechanism includes a solenoid as a drive source and a link mechanism structured to transmit power of the solenoid to the lock member 33. The moving mechanism moves the lock member 33 between a contact position (position shown by the two-dot chain line in FIG. 4) where the prevention part 33a is contacted with a card 2 from a lower side and a retreated position (position shown by the solid line in FIGS. 2 and 4) where the prevention part 33a is retreated to a lower side of the card conveying passage 6 so as to be separated from the card 2.

As described above, the shutter member 14 is disposed on a rear side portion of the card insertion part 4 and is disposed on a rear side with respect to the width detection mechanism 11, the thickness detection mechanism 12, the card existence/absence detection mechanism 13 and the prevention part 33a. In other words, the width detection mechanism 11, the thickness detection mechanism 12, the card existence/absence detection mechanism 13 and the prevention part 33a are disposed on a front side with respect to the shutter member 14 in the front and rear direction.

The conveying roller 16 is disposed so as to face the card conveying passage 6 from an upper side. The pad roller 17 is oppositely disposed to the conveying roller 16 so as to face the card conveying passage 6 from a lower side. Further, rotation centers of the conveying roller 16 and the pad roller 17 are disposed in the front and rear direction between the card contact parts 20a and the roller 23 and the light emitting part 31 and the light receiving part 32. The conveying roller 16 functions to convey a card 2 inserted into the card insertion port 3 to a rear side. Further, the conveying roller 16 is connected with a motor (not shown), which is a drive source for driving the conveying roller 16, through a power transmission mechanism (not shown) such as a pulley and a belt. The motor is attached with a rotation detection mechanism (encoder) structured to detect a rotation number and/or a rotation position of the motor (in other words, rotational state of the motor).

In the card reader 1, a normal card 2 which is inserted into the card insertion port 3 in a correct posture is taken into the inside of the card reader 1 (specifically, the inside of the main body part 5) and is processed. Further, the card 2 having been taken into the inside of the card reader 1 is stopped. Therefore, when the card 2 has been taken into the inside of the card reader 1, a light from the light emitting element to the light receiving element of the sensor 21 is intercepted by the light intercepting part 20b and thus, the card 2 is not detected by the width detection mechanism 11. Further, when the card 2 has been taken into the inside of the card reader 1, the light intercepting part 25a is separated from a position between the light emitting element and the light receiving element of the sensor 27 and thus, the card 2 is not detected by the thickness detection mechanism 12. In addition, when the card 2 has been taken into the inside of the card reader 1, the light receiving part 32 receives a light from the light emitting part 31 and thus the card 2 is not detected by the card existence/absence detection mechanism 13. On the other hand, if a criminal is trying to forcibly pull out the card 2 having been taken into the inside of the card reader 1 from the card insertion port 3 by some means in order to illegally acquire the card 2 having been taken into the inside of the card reader 1, the card 2 is detected by the width detection mechanism 11, the thickness detection mechanism 12 and the card existence/absence detection mechanism 13 during the card 2 is being pulled out.

The width detection mechanism 11, the thickness detection mechanism 12 and the card existence/absence detection mechanism 13 in this embodiment are a plurality of types of pulling-out detection mechanisms structured to detect abnormal pulling-out of a card 2 when the card 2 having been taken into the inside of the card reader 1 is forcibly pulled out from the card insertion port 3 (in other words, illegally being pulled out). The width detection mechanism 11, the thickness detection mechanism 12 and the card existence/absence detection mechanism 13 detect abnormal pulling-out of a card 2 in methods respectively different from each other.

In other words, the width detection mechanism 11 detects abnormal pulling-out of a card 2 when it detects end parts in the right and left direction of the card 2 at a timing when the end parts in the right and left direction of the card 2 should not be detected. Further, the thickness detection mechanism 12 detects abnormal pulling-out of a card 2 when it detects a thickness of the card 2 at a timing when a thickness of the card 2 should not be detected. In addition, the card existence/absence detection mechanism 13 detects abnormal pulling-out of a card 2 when it detects that the card 2 is existed in a portion of the card conveying passage 6 where the light emitting part 31 and the light receiving part 32 are disposed at a timing when it should not be detected that the card 2 is existed in the portion of the card conveying passage 6 where the light emitting part 31 and the light receiving part 32 are disposed.

In this embodiment, as shown in FIG. 4, when abnormal pulling-out of a card 2 is detected by all of the width detection mechanism 11, the thickness detection mechanism 12 and the card existence/absence detection mechanism 13, the moving mechanism of the pulling-out prevention mechanism 15 is activated and the lock member 33 is moved from the retreated position where the prevention part 33a is retreated to the contact position where the prevention part 33a is contacted with the card 2 and thereby the lock member 33 prevents pulling-out of the card 2. In other words, according to this embodiment, when a plurality of types of pulling-out detection mechanisms detects abnormal pulling-out of a card 2 (specifically, all of a plurality of types of the pulling-out detection mechanisms detect abnormal pulling-out of a card 2), the moving mechanism of the pulling-out prevention mechanism 15 is activated and the lock member 33 is moved from the retreated position to the contact position and thereby the lock member 33 prevents pulling-out of the card 2.

Principal Effects in this Embodiment

As described above, in this embodiment, the width detection mechanism 11, the thickness detection mechanism 12 and the card existence/absence detection mechanism 13 are a plurality of types of pulling-out detection mechanisms which detect abnormal pulling-out of a card 2 from the card insertion port 3, i.e., an actual phishing act. Further, the width detection mechanism 11, the thickness detection mechanism 12 and the card existence/absence detection mechanism 13 detect abnormal pulling-out of the card 2 in methods respectively different from each other. Therefore, according to this embodiment, it can be detected with a high degree of accuracy whether phishing is going to be performed or not by using the width detection mechanism 11, the thickness detection mechanism 12 and the card existence/absence detection mechanism 13. Further, in this embodiment, when abnormal pulling-out of a card 2 is detected by all of the width detection mechanism 11, the thickness detection mechanism 12 and the card existence/absence detection mechanism 13, the prevention part 33a is contacted with the card 2 and prevents pulling-out of the card 2. Therefore, an erroneous operation of the pulling-out prevention mechanism 15 can be restrained.

In this embodiment, the width detection mechanism 11, the thickness detection mechanism 12, the card existence/absence detection mechanism 13 and the prevention part 33a are disposed on a front side with respect to the shutter member 14 in the front and rear direction. Therefore, according to this embodiment, even when a front end side of a card 2 is conveyed to a front side with respect to the shutter member 14, abnormal pulling-out of the card 2 can be prevented. Further, in this embodiment, the prevention part 33a is formed to be pointed so as to be stuck into a card 2 and thus, pulling-out of the card 2 by a criminal can be prevented effectively.

Other Embodiments

Although the present invention has been shown and described with reference to a specific embodiment, various changes and modifications will be apparent to those skilled in the art from the teachings herein.

In the embodiment described above, the width detection mechanism 11, the thickness detection mechanism 12 and the card existence/absence detection mechanism 13 are a plurality of types of pulling-out detection mechanisms. When all of the width detection mechanism 11, the thickness detection mechanism 12 and the card existence/absence detection mechanism 13 detect abnormal pulling-out of a card 2, the prevention part 33a is contacted with the card 2 to prevent the pulling-out of the card 2. However, the present invention is not limited to this embodiment. For example, in addition to the width detection mechanism 11, the thickness detection mechanism 12 and the card existence/absence detection mechanism 13, a rotation detection mechanism structured to detect a rotating state of a motor which is a drive source for the conveying roller 16 may be used as one of a plurality of types of the pulling-out detection mechanisms. In this case, when all of the width detection mechanism 11, the thickness detection mechanism 12, the card existence/absence detection mechanism 13 and the rotation detection mechanism detect abnormal pulling-out of a card 2, the prevention part 33a is contacted with the card 2 to prevent the pulling-out of the card 2.

Further, a plurality of types of pulling-out detection mechanisms may be two or three detection mechanisms which are arbitrarily selected among the width detection mechanism 11, the thickness detection mechanism 12, the card existence/absence detection mechanism 13 and the rotation detection mechanism. In this case, when abnormal pulling-out of a card 2 is detected by all of two or three selected detection mechanisms, the prevention part 33a is contacted with the card 2 to prevent pulling-out of the card 2. In this embodiment, in a state that a card 2 has been taken into an inside of the card reader 1, the conveying roller 16 is stopped and a motor for driving the conveying roller 16 is not rotated. Therefore, abnormal pulling-out of a card 2 is detected through the encoder by detecting that the motor is rotated at a timing when the motor should not be rotated.

In the embodiment described above, the card insertion part 4 may include a magnetic detection mechanism such as a pre-head (magnetic head) or a magnetic sensor, which is structured to detect that magnetic data are recorded in a card 2, and a metal detection mechanism which is structured to detect that an external connection terminal of an IC chip is fixed to a card 2. In this case, the magnetic sensor is, for example, a flux gate sensor, an MI sensor which detects magnetic data by utilizing magnetic impedance, an MR sensor which detects magnetic data by utilizing a magnetoresistance effect, or a Hall sensor which detects magnetic data by utilizing a Hall effect.

Further, in this case, the width detection mechanism 11, the thickness detection mechanism 12, the card existence/absence detection mechanism 13, the rotation detection mechanism, the magnetic detection mechanism and the metal detection mechanism may be used as a plurality of types of pulling-out detection mechanisms. In this case, when abnormal pulling-out of a card 2 is detected by all of the width detection mechanism 11, the thickness detection mechanism 12, the card existence/absence detection mechanism 13, the rotation detection mechanism, the magnetic detection mechanism and the metal detection mechanism, the prevention part 33a is contacted with the card 2 to prevent pulling-out of the card 2. Further, it may be structured that two, three, four or five detection mechanisms arbitrarily selected from the width detection mechanism 11, the thickness detection mechanism 12, the card existence/absence detection mechanism 13, the rotation detection mechanism, the magnetic detection mechanism and the metal detection mechanism are used as a plurality of types of pulling-out detection mechanisms and, when abnormal pulling-out of a card 2 is detected by all of selected two, three, four or five detection mechanisms, the prevention part 33a is contacted with the card 2 to prevent pulling-out of the card 2. In this case, in a state that a card 2 has been taken into an inside of the card reader 1, no card 2 is existed in the card insertion part 4. Therefore, when the magnetic detection mechanism detects magnetic data at a timing when magnetic data should not be detected, abnormal pulling-out of a card 2 is detected. Further, when the metal detection mechanism detects an external connection terminal of an IC chip at a timing when the external connection terminal of the IC chip should not be detected, abnormal pulling-out of the card 2 is detected.

In the embodiment described above, the pulling-out prevention mechanism 15 is similarly structured to the prevention mechanism described in Patent Literature 1 (Japanese Patent Laid-Open No. 2001-222686). However, the pulling-out prevention mechanism 15 may be, for example, similarly structured to a card locking device described in Japanese Patent Laid-Open No. 2006-155567. Further, in the embodiment described above, the prevention part 33a is pointed so as to be capable of sticking into a card 2. However, the prevention part 33a is not required to be pointed if it can be contacted with a card 2 so as to prevent pulling-out of the card 2. For example, in a case that a prevention part 33a is formed of a member having a high friction coefficient and that the prevention part 33a is structured to contact with a card 2 so as to be capable of preventing pulling-out of the card 2, the prevention part 33a is not required to be pointed.

In the embodiment described above, the card existence/absence detection mechanism 13 and the prevention part 33a are disposed on a front side with respect to the shutter member 14 in the front and rear direction. However, the present invention is not limited to this embodiment. For example, the prevention part 33a and/or the card existence/absence detection mechanism 13 may be disposed on a rear side with respect to the shutter member 14 in the front and rear direction.

In the embodiment describe above, the width detection mechanism 11 is structured of the detection lever 20, the optical type sensor 21 and the like. However, the present invention is not limited to this embodiment. For example, the width detection mechanism 11 may be structured of a detection lever 20, a micro-switch which detects a movement of the detection lever 20 and the like. Further, the width detection mechanism 11 may be, for example, structured of an optical type sensor having a light emitting element and a light receiving element which are disposed in the upper and lower direction so as to interpose a portion of the card conveying passage 6 where a card 2 is passed. Alternatively, the width detection mechanism 11 may be, for example, structured of a micro-switch which is disposed at a position where an end part in a longitudinal direction of a card 2 is contacted. Further, the sensor 27 may be a micro-switch or the like.

In the embodiment described above, the card 2 is a rectangular card made of vinyl chloride whose thickness is about 0.7-0.8 mm. However, the present invention is not limited to this embodiment. For example, the card 2 may be a PET (polyethylene terephthalate) card whose thickness is about 0.18-0.36 mm or may be a paper card having a predetermined thickness. Further, the card 2 may be incorporated with no IC chip. Further, in the embodiment described above, the card reader 1 is structured so that a card 2 is taken into in a short-side direction of the card 2 and is performed with a predetermined processing. However, the card reader 1 may be structured so that a card 2 is taken into in a longitudinal direction of the card 2 and is performed with a predetermined processing.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card reader for use with a card, the card reader comprising:
   a card insertion port into which the card is inserted and from which the card is ejected;
   a plurality of types of pulling-out detection mechanisms structured to detect abnormal pulling-out of the card from the card insertion port; and
   a pulling-out prevention mechanism structured to prevent the abnormal pulling-out of the card from the card insertion port;
   wherein the pulling-out prevention mechanism comprises:
      a lock member comprising a prevention part configured to contact with the card and prevent pulling-out of the card; and
      a moving mechanism structured to move the lock member between a contact position where the prevention part is contacted with the card and a retreated position where the prevention part is retreated so as to be separated from the card;
   wherein the plurality of types of the pulling-out detection mechanisms detects the abnormal pulling-out of the card by methods different from each other;
   wherein the lock member is moved to the contact position from the retreated position to prevent pulling-out of the card when the abnormal pulling-out of the card from the card insertion port is detected by the plurality of types of the pulling-out detection mechanisms;
   the plurality of types of the pulling-out detection mechanisms comprises:
      a thickness detection mechanism structured to detect a thickness of the card;
      a width detection mechanism structured to detect an end part in a width direction of the card which is perpendicular to a thickness direction of the card and a conveying direction of the card; and
      a card existence/absence detection mechanism structured to detect existence/absence of the card,
   wherein when the abnormal pulling-out of the card from the card insertion port is detected by all of the thickness detection mechanism, the width detection mechanism and the card existence/absence detection mechanism, the lock member is moved to the contact position from the retreated position to prevent the pulling-out of the card.

2. The card reader according to claim 1, further comprising:
   a card conveying passage where the card inserted into the card insertion port is conveyed; and
   a shutter member structured to move between a closing position where the card conveying passage is closed so that the card is not taken into an inside of the card reader and an open position where the card conveying passage is opened so that the card is capable of being taken into the inside of the card reader,
   wherein the plurality of types of the pulling-out detection mechanisms and the prevention part are disposed on a front side with respect to the shutter member in a conveying direction of the card.

3. The card reader according to claim 2, further comprising:
   a conveying roller structured to convey the card inserted into the card insertion port; and
   a motor which is a drive source structured to drive the conveying roller,
   wherein the plurality of types of the pulling-out detection mechanisms comprises:
      a rotation detection mechanism structured to detect a rotating state of the motor, and
   wherein when the abnormal pulling-out of the card from the card insertion port is detected by all of the thickness detection mechanism, the width detection mechanism, the card existence/absence detection mechanism and the rotation detection mechanism, the lock member is moved to the contact position from the retreated position to prevent the pulling-out of the card.

4. The card reader according to claim 1, wherein the prevention part is pointed so as to be capable of sticking into the card.

5. The card reader according to claim 1, further comprising:
   a conveying roller structured to convey the card inserted into the card insertion port; and
   a motor which is a drive source structured to drive the conveying roller,
   wherein the plurality of types of the pulling-out detection mechanisms comprises:
      a rotation detection mechanism structured to detect a rotating state of the motor, and
   wherein when the abnormal pulling-out of the card from the card insertion port is detected by all of the thickness detection mechanism, the width detection mechanism, the card existence/absence detection mechanism and the rotation detection mechanism, the lock member is moved to the contact position from the retreated position to prevent the pulling-out of the card.

6. The card reader according to claim 1, wherein
   the card reader is structured so that the card passes through the plurality of types of the pulling-out detection mechanisms and is taken into an inside of the card reader, and the card is stopped and processed at a position on an inner side with respect to the plurality of types of the pulling-out detection mechanisms, and
   in a state that the card has been taken into the inside of the card reader, when the card is detected by the plurality of types of the pulling-out detection mechanisms, the lock member is moved to the contact position from the retreated position to prevent the pulling-out of the card.

7. The card reader according to claim 6, wherein
   the card is stopped and processed at a position on an inner side with respect to the thickness detection mechanism, the width detection mechanism and the card existence/absence detection mechanism, and
   in a state that the card has been taken into the inside of the card reader, when the card is detected by the thickness detection mechanism, the width detection mechanism and the card existence/absence detection mechanism, the lock member is moved to the contact position from the retreated position to prevent the pulling-out of the card.

8. The card reader according to claim 7, further comprising:
   a conveying roller structured to convey the card inserted into the card insertion port;

a motor which is a drive source structured to drive the conveying roller, and a rotation detection mechanism structured to detect a rotating state of the motor, and wherein when the abnormal pulling-out of the card from the card insertion port is detected by all of the thickness detection mechanism, the width detection mechanism, the card existence/absence detection mechanism and the rotation detection mechanism, the lock member is moved to the contact position from the retreated position to prevent the pulling-out of the card.

9. The card reader according to claim 6, further comprising:

a card conveying passage where the card inserted into the card insertion port is conveyed; and a shutter member structured to move between a closing position where the card conveying passage is closed so that the card is not taken into an inside of the card reader and an open position where the card conveying passage is opened so that the card is capable of being taken into the inside of the card reader, wherein the plurality of types of the pulling-out detection mechanisms and the prevention part are disposed on a front side with respect to the shutter member in a conveying direction of the card.

10. A card reader for use with a card, the card reader comprising:

a card insertion port into which the card is inserted and from which the card is ejected;

a plurality of types of pulling-out detection mechanisms structured to detect abnormal pulling-out of the card from the card insertion port;

a pulling-out prevention mechanism structured to prevent the abnormal pulling-out of the card from the card insertion port;

a conveying roller structured to convey the card inserted into the card insertion port; and a motor which is a drive source structured to drive the conveying roller;

wherein the plurality of types of the pulling-out detection mechanisms detects the abnormal pulling-out of the card by methods different from each other;

wherein the lock member is moved to the contact position from the retreated position to prevent pulling-out of the card when the abnormal pulling-out of the card from the card insertion port is detected by the plurality of types of the pulling-out detection mechanisms;

wherein the plurality of types of the pulling-out detection mechanisms comprises:

a thickness detection mechanism structured to detect a thickness of the card;

a width detection mechanism structured to detect an end part in a width direction of the card which is perpendicular to a thickness direction of the card and a conveying direction of the card;

a card existence/absence detection mechanism structured to detect existence/absence of the card; and a rotation detection mechanism structured to detect a rotating state of the motor, and wherein when the abnormal pulling-out of the card from the card insertion port is detected by all of the thickness detection mechanism, the width detection mechanism, the card existence/absence detection mechanism and the rotation detection mechanism, the lock member is moved to the contact position from the retreated position to prevent the pulling-out of the card.

11. A card reader for use with a card, the card reader comprising:

a card insertion port into which the card is inserted and from which the card is ejected;

a plurality of types of pulling-out detection mechanisms structured to detect abnormal pulling-out of the card from the card insertion port; and a pulling-out prevention mechanism structured to prevent the abnormal pulling-out of the card from the card insertion port;

wherein the pulling-out prevention mechanism comprises:

a lock member comprising a prevention part configured to contact with the card and prevent pulling-out of the card; and a moving mechanism structured to move the lock member between a contact position where the prevention part is contacted with the card and a retreated position where the prevention part is retreated so as to be separated from the card;

wherein the plurality of types of the pulling-out detection mechanisms detects the abnormal pulling-out of the card by methods different from each other;

wherein the lock member is moved to the contact position from the retreated position to prevent pulling-out of the card when the abnormal pulling-out of the card from the card insertion port is detected by the plurality of types of the pulling-out detection mechanisms;

wherein the card reader is structured so that the card passes through the plurality of types of the pulling-out detection mechanisms and is taken into an inside of the card reader, and the card is stopped and processed at a position on an inner side with respect to the plurality of types of the pulling-out detection mechanisms, wherein in a state that the card has been taken into the inside of the card reader, when the card is detected by the plurality of types of the pulling-out detection mechanisms, the lock member is moved to the contact position from the retreated position to prevent the pulling-out of the card;

wherein the plurality of types of the pulling-out detection mechanisms comprises:

a thickness detection mechanism structured to detect a thickness of the card;

a width detection mechanism structured to detect an end part in a width direction of the card which is perpendicular to a thickness direction of the card and a conveying direction of the card; and a card existence/absence detection mechanism structured to detect existence/absence of the card, the card is stopped and processed at a position on an inner side with respect to the thickness detection mechanism, the width detection mechanism and the card existence/absence detection mechanism, and in a state that the card has been taken into the inside of the card reader, when the card is detected by the thickness detection mechanism, the width detection mechanism and the card existence/absence detection mechanism, the lock member is moved to the contact position from the retreated position to prevent the pulling-out of the card.

* * * * *